(No Model.) 2 Sheets—Sheet 1.

C. F. HINMAN & M. G. BUNNELL.
FIFTH WHEEL.

No. 475,313. Patented May 24, 1892.

Witnesses.
Fred'k. H. Mills.
Margaret M. Wagner.

Inventors.
Clement F. Hinman
Morton G. Bunnell
By Chas. G. Page
Atty.

(No Model.) 2 Sheets—Sheet 2.

C. F. HINMAN & M. G. BUNNELL.
FIFTH WHEEL.

No. 475,313. Patented May 24, 1892.

Witnesses
Fred'k H. Mills
Margaret M. Wagner

Inventors
Clement F. Hinman
Morton G. Bunnell
By Chas. G. Page
Atty.

THE NORRIS PETERS CO., PHOTO-LITHO., WASHINGTON, D. C.

UNITED STATES PATENT OFFICE.

CLEMENT F. HINMAN AND MORTON G. BUNNELL, OF CHICAGO, ILLINOIS, ASSIGNORS TO FREDERICK C. AUSTIN, OF SAME PLACE.

FIFTH-WHEEL.

SPECIFICATION forming part of Letters Patent No. 475,313, dated May 24, 1892.

Application filed July 3, 1891. Serial No. 398,434. (No model.)

*To all whom it may concern:*

Be it known that we, CLEMENT F. HINMAN and MORTON G. BUNNELL, both of Chicago, in the county of Cook and State of Illinois, have invented a certain new and useful Improvement in Fifth-Wheels, of which the following is a specification.

Our invention relates to the forward running-gear of wagons, and more particularly to the forward running-gear of a dumping-wagon described in our application for Letters Patent of the United States, filed February 24, 1891, and serially numbered 382,356.

The object of our invention is to provide efficient means for preventing side tilt of the wagon and to provide new and useful means for establishing a connection between the body-frame and front axle through the medium of a vibratory king-bolt.

In carrying out our invention we employ a vibratory king-bolt and pivotally support the same at its lower end upon the front axle, so that it may vibrate laterally to the length of the wagon. We provide a circle which is rigid with the body-frame and provided with a steady-bearing for the king-bolt, which latter is at its upper end connected with the body-frame. The circle thus connected with the body-frame could as a matter of course be arranged to turn on a circular bearing or lower circle rigid with the front axle; but as a simpler arrangement we arrange the circle to turn on a bearing, which is also utilized as a pivot for the vibratory king-bolt.

Figure 1:
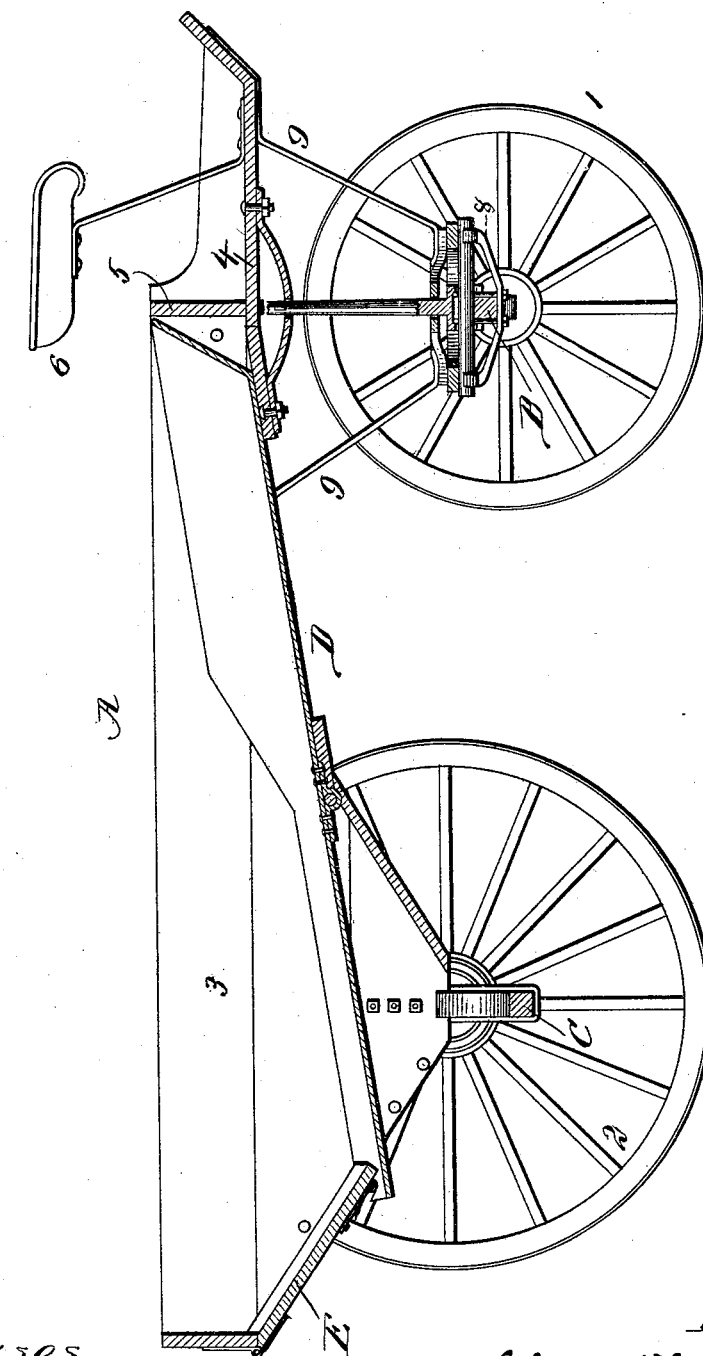
Figure 2:
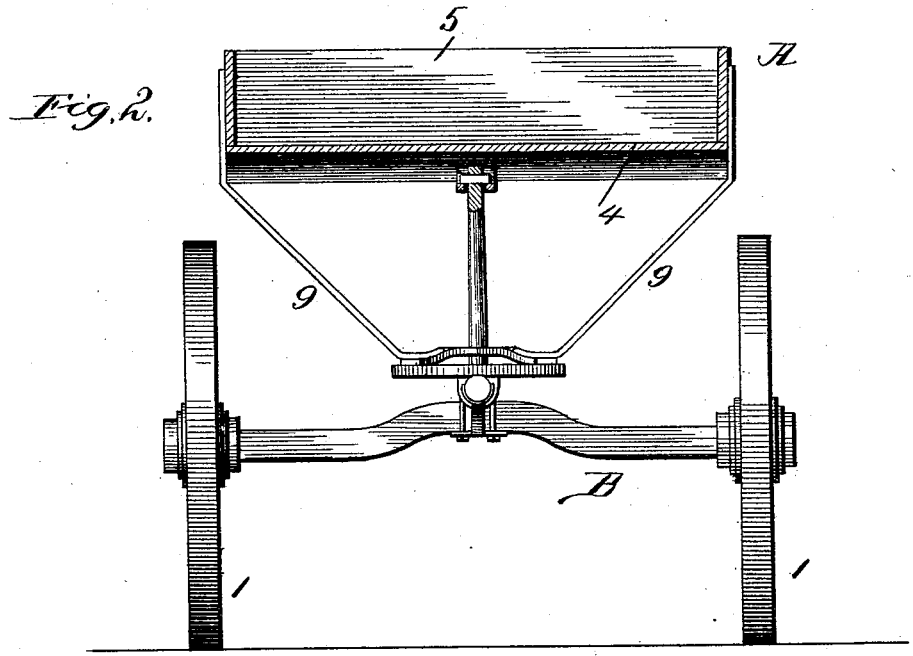
Figure 3:
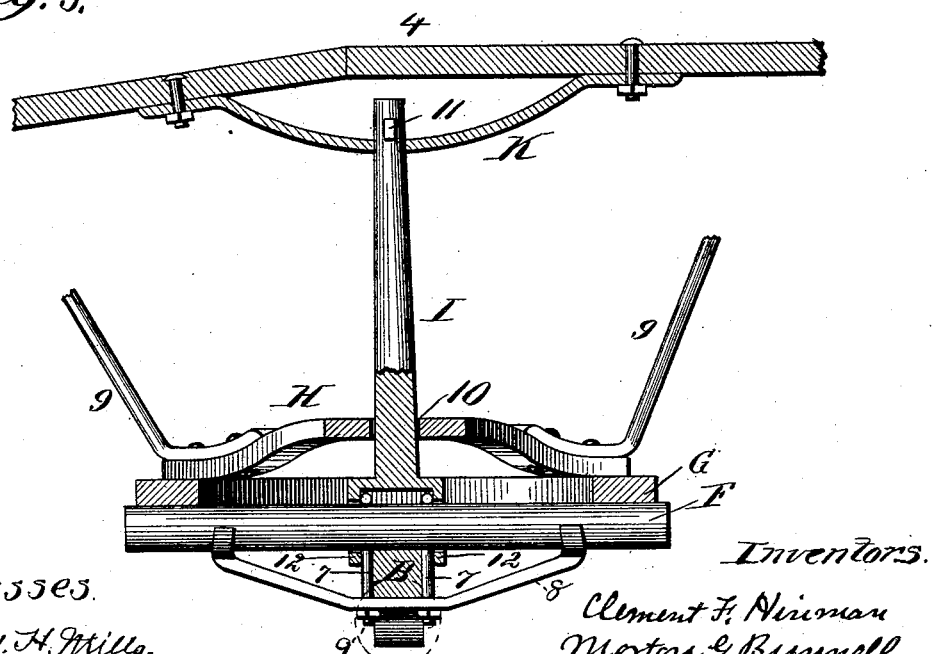

In the accompanying drawings, Figure 1 is a longitudinal vertical section taken centrally through the wagon. Fig. 2 is a vertical section taken transversely through the forward end portion of the wagon, and shows the forward running-gear in elevation, the upper end of the king-bolt being, however, shown in vertical section. Fig. 3 shows, on a larger scale than the preceding figures, the forward running-gear partly in vertical central section on a plane coincident with the length of the wagon, and also shows in longitudinal central section a portion of the body-frame.

The body-frame A is supported upon a front axle B, which is provided with wheels 1, and a rear axle C, which is provided with wheels 2. The front wheels are smaller than the rear wheels, and the forward end portion of the body-frame has its bottom portion sufficiently elevated to allow the front wheels to run under it in turning, and thereby allow the wagon to be turned quickly and within a small space. The body-frame comprises sides 3, having their lower edge portions inclined upwardly from rear to front, and a horizontal platform 4 forward of its front vertical end 5 and below the driver's seat 6. The tilting bottom D is pivoted to the sides at a point between its ends, and when in its closed position lies between the sides in an inclined position, as in Fig. 1.

The devices for operating the tilting bottom D and end-gate E are not herein shown, the same being fully illustrated in our previous application.

The front axle B supports and is rigid with a bearing F for the fifth-wheel or circle G. The bearing F is formed by a rod or bar, which is preferably round at the points where the circle bears and turns upon it, although it may for convenience be made round throughout its length. Said bar or bearing is arranged coincident with the length of the wagon and crosses the longitudinal middle of the front axle, to which it is firmly secured by clips 7 and a two-armed brace 8. The clips pass over the bar F and along opposite sides of the axle and have their lower ends extended through the bar or plate which forms the brace 8. The brace 8 is held against the under side of the axle by nuts 9, which are fitted upon threaded ends of the clips and tightened up against the horizontal middle portion of the brace, which from said portion extends upwardly and toward the ends of the bar F, so as to engage the same near its ends, and thereby effectively hold and steady it.

The fifth-wheel or circle G rests and turns upon the bearing F and is rigidly connected with the body-frame by brace-rods 9. These brace-rods are at their upper ends secured to the body-frame in any suitable way and are at their lower ends seated upon and rigidly bolted to a spider H, which is in turn seated upon and made rigid with the circle. The vibratory or tilting king-bolt I is supported to tilt or vibrate upon the bar or bearing F and extends upwardly through a bearing-opening formed at 10 in the center of the spider H, which latter therefore provides a bearing for the king-bolt. The upper end of the long king-bolt extends through an opening in a bearing K, which is secured to the forward portion 4 of the body-frame, and at a point above said bearing the king-bolt is provided with a shoulder or stop 11, which prevents its disengagement from said bearing.

The lower end of the king-bolt is forked, so as to provide it with cheeks or ears 12, which at their lower ends lie, respectively, at opposite sides of the axle. The cheeks are provided with openings for the bar or bearing F, which extends through said openings, and thus provides a pivot upon which the king-bolt can vibrate, and as a simple and compact arrangement the clips 7 lie between the ears 12 of the king-bolt and the vertical sides of the axle.

By the foregoing arrangement the front axle can tilt independently of the body-frame when one of its wheels is suddenly raised by running over an obstruction or lowered by running in a depression along the road, and hence the wagon-body will be steadied and kept from undue side rocking.

What we claim as our invention is—

1. The combination, substantially as hereinbefore set forth, of the front axle, the vibratory king-bolt pivotally supported at its lower end upon the front axle, the circle arranged to turn upon a bearing rigid with the front axle and rigidly connected with the body-frame, and a spider rigid with the circle and providing a bearing through which the king-bolt extends.

2. The combination of the front axle, the vibratory king-bolt pivotally supported at its lower end upon the front axle, the circle rigidly connected with the body-frame and supported to turn upon a bearing rigid with the front axle, a bearing for the king-bolt rigid with the circle, and an upper bearing K for the king-bolt secured to the raised forward end portion of the body-frame, substantially as set forth.

3. The combination of the front axle, the bearing F, rigid with the front axle, clips 7 and a brace 8, arranged to secure said bearing to the front axle, and the vibratory king-bolt pivotally supported on said bearing, substantially as set forth.

4. The combination, in a fifth-wheel, of a rod or bar F, supported upon the axle, the vibratory king-bolt I, having its lower end provided with a fork arranged to straddle said rod or bar, which extends through cheeks 12, formed by the sides of the fork, and the circle arranged to turn the said rod or bar and connected with the body-frame, substantially as described.

CLEMENT F. HINMAN.
MORTON G. BUNNELL.

Witnesses:
MARGARET M. WAGNER,
FREDK. H. MILLS.